(12) United States Patent
Nakatsu et al.

(10) Patent No.: US 9,519,207 B2
(45) Date of Patent: Dec. 13, 2016

(54) WAVELENGTH CONVERTING DEVICE AND LIGHT EMITTING DEVICE USING THE SAME

(71) Applicant: Nichia Corporation, Anan-shi (JP)

(72) Inventors: Yoshitaka Nakatsu, Komatsushima (JP); Takafumi Sugiyama, Yoshinogawa (JP)

(73) Assignee: NICHIA CORPORATION, Anan-Shi (JP)

( * ) Notice: Subject to any disclaimer, the term of this patent is extended or adjusted under 35 U.S.C. 154(b) by 259 days.

(21) Appl. No.: 13/726,785

(22) Filed: Dec. 26, 2012

(65) Prior Publication Data
US 2013/0163225 A1 Jun. 27, 2013

(30) Foreign Application Priority Data
Dec. 27, 2011 (JP) .............................. P 2011/285699

(51) Int. Cl.
*G03B 33/06* (2006.01)
*C09K 11/02* (2006.01)
(Continued)

(52) U.S. Cl.
CPC .............. *G03B 33/06* (2013.01); *C04B 35/44* (2013.01); *C04B 35/6303* (2013.01); *C09K 11/02* (2013.01); *C09K 11/7774* (2013.01); *G03B 21/204* (2013.01); *H04N 9/3161* (2013.01); *C04B 2235/3215* (2013.01); (Continued)

(58) Field of Classification Search
CPC ........... H01L 2924/12041; H01L 33/50; H01L 33/501; H01L 33/502; F21V 9/16; F21Y 2101/02;F21K 9/30; F21S 48/115; G03B 33/06; G03B 21/204; H04N 9/3161; C04B 35/6303; C04B 35/44; C04B 2235/3284; C04B 2235/445; C04B 2235/3215; C04B 2235/6582; C04B 2235/666; C04B 2235/764; C04B 2235/3222; C04B 2235/3224; C04B 2235/3229; C04B 2235/5436; C09K 11/7774; C09K 11/02
(Continued)

(56) References Cited

U.S. PATENT DOCUMENTS 7,758,224 B2 * 7/2010 Hama et al. .................. 362/555
2005/0274967 A1 12/2005 Martin et al.
(Continued)

FOREIGN PATENT DOCUMENTS

JP    H11-174019 A    7/1999
JP    2000-185986 A    7/2000
(Continued)

*Primary Examiner* — Stephen F Husar
*Assistant Examiner* — Danielle Allen
(74) *Attorney, Agent, or Firm* — Foley & Lardner LLP (57) ABSTRACT

Provided is a wavelength converting device having excellent optical output.
The wavelength converting device includes a substrate and a wavelength converting member disposed on the substrate. The wavelength converting member includes a fluorescent material powder and a binder binding the fluorescent material powder. An upper surface of the wavelength converting member serves as a light emitting surface which includes upper surfaces of the fluorescent material powder and an upper surface of the binder. The binder has first recesses formed adjacent to the fluorescent material powder in the upper surface of the binder.

18 Claims, 4 Drawing Sheets

(51) Int. Cl.
    *C09K 11/77*   (2006.01)
    *C04B 35/44*   (2006.01)
    *C04B 35/63*   (2006.01)
    *G03B 21/20*   (2006.01)
    *H04N 9/31*    (2006.01)

(52) U.S. Cl.
    CPC ............... *C04B 2235/3222* (2013.01); *C04B 2235/3224* (2013.01); *C04B 2235/3229* (2013.01); *C04B 2235/3284* (2013.01); *C04B 2235/445* (2013.01); *C04B 2235/5436* (2013.01); *C04B 2235/6582* (2013.01); *C04B 2235/666* (2013.01); *C04B 2235/764* (2013.01); *C04B 2235/945* (2013.01)

(58) Field of Classification Search
    USPC ...... 362/2, 601, 510, 166, 230, 231, 293, 84
    See application file for complete search history.

(56) References Cited

U.S. PATENT DOCUMENTS

| | | |
|---|---|---|
| 2008/0180018 A1 | 7/2008 | Minamoto et al. |
| 2011/0278609 A1 | 11/2011 | Jeong et al. |

FOREIGN PATENT DOCUMENTS

| | | |
|---|---|---|
| JP | 2002-062358 | 2/2002 |
| JP | 2006-037097 A | 2/2006 |
| JP | 2008-115223 A | 5/2008 |
| JP | 2010-229002 A | 10/2010 |
| JP | 2011-122067 | 6/2011 |
| TW | 201140886 A1 | 11/2011 |
| WO | WO-2007/148829 A1 | 12/2007 |
| WO | WO-2011/097379 A1 | 8/2011 |

\* cited by examiner

WAVELENGTH CONVERTING DEVICE AND LIGHT EMITTING DEVICE USING THE SAME

BACKGROUND OF THE INVENTION

1. Field of the Invention

The present invention relates to a wavelength converting device which is capable of obtaining a high optical output power, and to a light emitting device using the same.

2. Discussion of the Related Art

A wavelength converting device has been known, made by mixing a fluorescent material powder and a glass powder and sintering them (for example in JP 2011-122067A). According to the wavelength converting device of Patent Literature 1; JP2011-122067A, glass having high heat resistance and weather resistance is used as a binder, and thus discoloration and reduction in luminance can be avoided even after a long period of use.

RELATED ART REFERENCE

Patent Literature

Patent Literature 1: JP 2011-122067A

However, a conventional wavelength converting device has a problem in that light whose wavelength is converted by a fluorescent material powder is emitted to outside through a binder near the fluorescent powder, the light may be absorbed by the binder which may result in a decrease in the optical output.

SUMMARY OF THE INVENTION

Accordingly, the present invention is conceived to solve the problem referred to above, and an object of the present invention is to provide a wavelength converting device capable of obtaining a high optical output.

The wavelength converting device according to an embodiment of the present invention includes a substrate and a wavelength converting member provided on the substrate. The wavelength converting member includes a fluorescent material powder and a binder for binding the fluorescent material powder. An upper surface of the wavelength converting member is a light emitting surface which includes upper surface of the fluorescent material powder and an upper surface of the binder, and first recesses are formed adjacent to the fluorescent material powder in the upper surface of the binder.

The present invention provides an improvement in optical output power and accordingly, a wavelength converting device capable of obtaining a high optical output can be provided.

DETAILED DESCRIPTION OF EMBODIMENTS

The following description will describe an embodiment of the present invention with reference to the drawings. The embodiments described below are intended to exemplify the technical spirit of the present invention, and the scope of the invention is not limited to those described below. The sizes and the positional relationships of the members in each of drawings are occasionally shown exaggerated for ease of explanation.

Further, in the description below, the same designations or the same reference numerals may, in principle, denote the same or like members and duplicative descriptions will be appropriately omitted.

Figure 1:
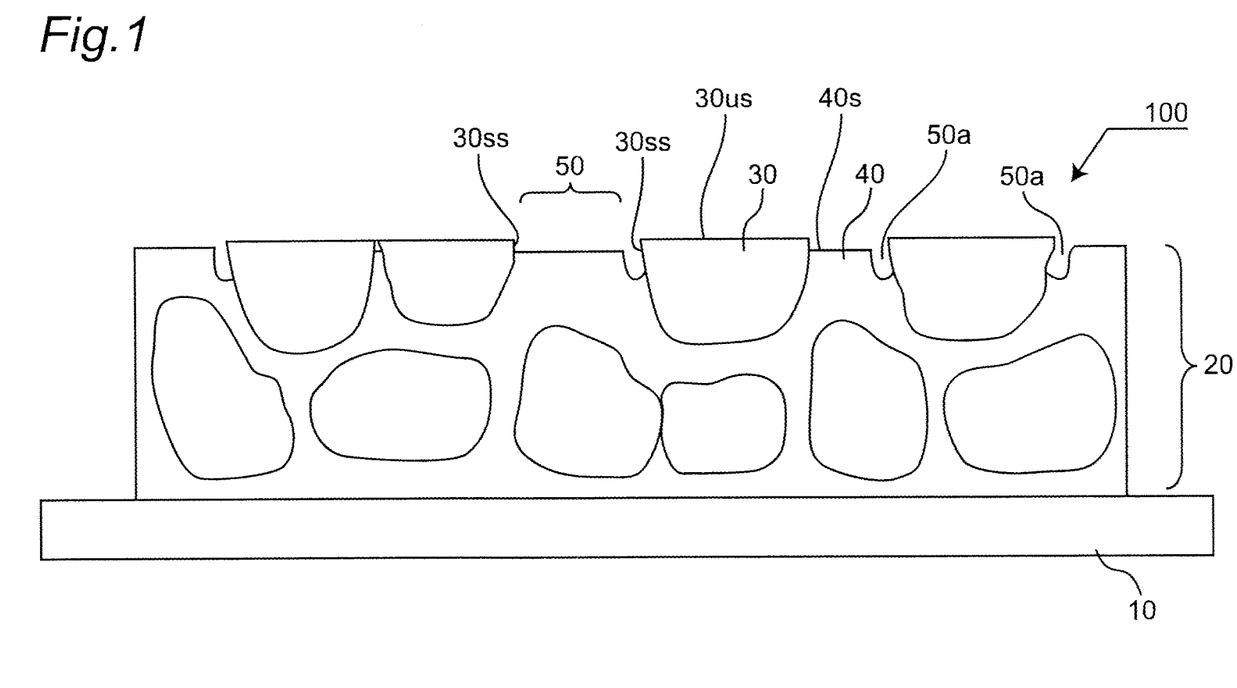
FIG. 1 is a cross-sectional view of a wavelength converting device according to an embodiment of the present invention.

FIG. 1 shows a cross-sectional view of a wavelength converting device according to the present embodiment.

As shown in FIG. 1, the wavelength converting device 100 includes a substrate 10 and a wavelength converting member 20 disposed on the substrate 10. The wavelength converting member 20 has a fluorescent material powder 30 and a binder 40 binding the fluorescent material powder 30.

At the light emitting surface of the wavelength converting member 20 (i.e., the upper surface of the wavelength converting member 20), the surfaces of the fluorescent material powder 30 are exposed. In other words, the light emitting surface of the wavelength converting member 20 includes the exposed upper surfaces of the fluorescent material powder 30 and the upper surface of the binder 40. In the wavelength converting device 100 of the present embodiment, the upper surface of the binder 40 has the first recesses 50a adjacent to the fluorescent material powder 30. With this arrangement, light can be emitted through the side surfaces 30ss of the fluorescent material powder 30 exposed by the formation of the first recesses 50a. At the upper surface of the wavelength converting member 20, the upper surfaces 30us of the fluorescent material powder 30 and the surface 40s of the binder 40 are respectively flat, and further, the fluorescent material powder 30 is held protruding from the upper surface of the binder 40. That is, at the upper surface of the wavelength converting member 20, the upper surface 40s of the binder 40 is lower than the upper surfaces 30us of the fluorescent material powder 30 in order to form the second recesses 50 whose bottom surfaces are the upper surface 40s of the binder 40. In this manner, the fluorescent material powder 30 exposed at the upper surface of the wavelength converting member 20 have the flat surfaces 30us protruded from the upper surface of the binder 40, and thus, a part of the side surfaces of the fluorescent material powder 30 are further exposed by the second recesses 50. In the wavelength converting device 100 configured as described above, portions of the side surfaces of the fluorescent material powder 30 are exposed at the upper surface of the wavelength converting member 20 by the first recesses 50a and the second recesses 50, so that light released from the exposed side surfaces are emitted without passing through the binder 40. Hereinafter, the exposed portions of the side surfaces will be denoted as 30ss and will be referred to as the side surfaces 30ss. In the present embodiment, a preferable configuration which includes the first recesses 50a and the second recesses 50 is illustrated, but the present invention is not limited thereto, as long as the first recesses 50a and/or the second recesses 50 are included. For example, the upper surfaces 30us of the fluorescent material powder 30 and the surface 40s of the binder 40 may lie in a same plane.

With this arrangement, a wavelength converting device excellent in optical output can be obtained.

This means that the binder 40 is ideally capable of totally allowing a wavelength-converted light to pass through, but practically, a part of the wavelength-converted light is absorbed by the binder 40 or at the interface between the fluorescent material powder 30 and the binder 40. As a result, there has been a problem of reduction in the optical output. Accordingly, in the present embodiment, first recesses 50a and/or second recesses 50 are formed in the upper surface of the wavelength converting member 20 to expose a part of the side surfaces 30ss of the fluorescent material powder 30. With this arrangement, the amount of the wavelength-converted light by the fluorescent material powder 30 which is directly emitted to outside without passing the binder 40 increases. Thus, optical loss in the binder 40 can be suppressed.

In the specification, the expression "expose" the side surfaces of the fluorescent material powder 30 means a state where the corresponding parts of the fluorescent material powder are not covered with the binder 40. Therefore, not only a state where a part of the fluorescent material powder is directly exposed but also a state where a part of the fluorescent material powder is covered with an other member (for example, a non-reflecting protective film to be described later) is included.

Also, any side surface which is exposed by the formation of the first recess 50a or the second recess 50 will be referred to as the side surface "ss".

Hereinafter, each component of the wavelength converting device 100 will be described.

(Substrate 10)

The substrate 10 is for disposing a wavelength converting member 20 thereon. When the wavelength converting member 20 is irradiated with excitation light, the wavelength of the excitation light is converted by the fluorescent material powder 30. At this time, the fluorescent material powder 30 emits not only a wavelength converted light but also heat. Therefore, the substrate 10 can be made of a material having excellent heat dissipation property. For example, a metallic substrate or a ceramic substrate can be exemplified as a preferable substrate having excellent heat dissipation properties. That is, the substrate 10 can be made by using copper or aluminum. It is obvious that the effects of the present invention can be obtained even with a structure that does not have the substrate 10 in the wavelength converting device 100.

(Wavelength Converting Member 20)

The wavelength converting member 20 has a fluorescent material powder 30 and a binder 40. The wavelength converting member 20 can be formed by, for example, mixing a fluorescent material powder 30 and a binder 40 and using a sintering technique such as SPS (Spark Plasma Sintering), HIP (Hot-Isostatic Pressing), or CIP (Cold Plasma Sintering). When the wavelength converting member 20 is irradiated with excitation light, wavelength-converted light is released from the fluorescent material powder 30.

The wavelength converting member 20 preferably has a plate shape. Thus, the wavelength converting member 20 can be disposed stably on the substrate 10. The thickness of the wavelength converting member in a range of 50 to 500 μm can provide efficient dissipation of heat generated from the wavelength converting member to the substrate.

In the present embodiment, a fluorescent material powder 30 is used, which is capable of being excited by blue excitation light having a wavelength of 440 to 480 nm and releasing green light of a wavelength of 500 to 540 nm. Examples of the fluorescent material powder capable of satisfying the conditions described above typically include $Lu_3Al_5O_{12}$:Ce, $Y_3Al_5O$:Ce, and $Y_{2.5}Gd_{0.5}Al_{2.5}Ga_{2.5}O_{12}$:Ce. Moreover, rare-earth aluminate fluorescent materials mainly activated with lanthanoid elements and nitride-based fluorescent materials mainly activated with lanthanoid elements, which will be described below, can also be used.

1. Rare-Earth Aluminate Fluorescent Materials

A rare-earth aluminate fluorescent material includes at least one element selected from rare-earth elements and aluminum in the host crystal and activated with at least one element selected from rare-earth elements, and is capable of being excited by short-wavelength visible light or ultraviolet light and is capable of emitting green to red light. Examples of the rare-earth aluminate fluorescent materials include $Re_3(Al_{1-y}Ga_y)_5O_{12}$:Ce ($0 \leq y \leq 1$, where Re is at least one rare-earth element selected from the group consisting of Y, Gd, Ce, La, Lu, Tb, Sc, Pr, Sm, and Eu).

For example, the yttrium aluminum oxide garnet based fluorescent materials activated with cerium are capable of emitting a green light or a red light. Emission spectra of this kind of fluorescent materials having a garnet structure can be shifted toward shorter wavelengths by substituting a part of Al with Ga, and toward longer wavelengths by substituting a part of Re in the composition with Gd and/or La. Thus, altering the composition allows adjusting the emission color in a continuous fashion. Such rare-earth aluminate fluorescent materials are represented by, for example, the general formula $(Y_{1-x}Gd_x)_3(Al_{1-y}Ga_y)_5O_{12}$:Ce (where $0 \leq x \leq 1$, $0 \leq y \leq 1$).

The yttrium aluminum garnet-based fluorescent material capable of emitting a green light has a garnet structure and thus resistant to heat, light, and moisture. The peak wavelength of the excitation absorption spectrum is in the vicinity of 420 nm to 470 nm and the luminance peak wavelength $\lambda p$ is in the vicinity of 510 nm.

The yttrium aluminum garnet-based fluorescent material capable of emitting a red light also has a garnet structure likewise to the green-fluorescent material, and thus resistant to heat, light, and moisture. The peak wavelength of the excitation absorption spectrum is in the vicinity of 420 nm to 470 nm. The emission peak wavelength $\lambda p$ is in the vicinity of 600 nm, and the luminance spectrum is broad with a tail extending in the vicinity of 750 nm.

2. Nitride-Based Fluorescent Materials

For a nitride-based fluorescent material, a red light emitting fluorescent material such as $(Ca,Sr)_2Si_5N_8$:Eu and $(Ca,Sr)AlSiBN_3$:Eu is suitably used, and for example, a fluorescent material represented by the general formula $M_xAl_ySi_zO_aN_b$:Eu$^{2+}$ (where M is at least one selected from the group consisting of Mg, Zn, Ca, Sr, and Ba, $0.5 \leq x \leq 3$, $0.5 \leq y \leq 3$, $0.5 \leq z \leq 9$, $0 \leq a \leq 3$, $0.5 \leq b \leq 3$) can be also used.

With the use of the rare-earth aluminate fluorescent materials or the nitride-based fluorescent materials as described above, a wavelength converting member 20 capable of emitting light of various wavelengths, including a red color, can be formed without being limited to the use of the fluorescent materials capable of emitting a green light of the wavelength of 500 to 540 nm.

The fluorescent material powders described above may be formed by adding an aid agent to mixed raw materials with an aim of facilitating the sintering reaction and/or adjusting the particle size, and sintering them. In the present specification, an aid agent added at the time of preparing fluorescent material powder is referred to as an "aid agent A" in order to distinguish it from an aid agent added when the wavelength converting member 20 is formed by sintering, which will be described later.

Examples of the aid agent A used in preparing the fluorescent material powder made by a rare-earth aluminate fluorescent material include:
(1) alkali metal phosphate such as $Li_3PO_4$ and $K_3PO_4$,
(2) ammonium hydrogen phosphate such as $KH_2PO_4$, $NH_4H_2PO_4$, and $(NH_4)_2HPO_4$, and
(3) $BPO_4$, $AlPO_4$ etc.,
additionally,
(4) halogen compound such as $BaF_2$ and $SrF_2$, and
(5) borate such as $B_2O_3$, $H_3BO_3$, and $NaB_4O_7$.

Examples of the aid agent A used in preparing the fluorescent material powder made by a nitride-based fluorescent material include:
(1) halogen compound such as fluoride or chloride, such as magnesium fluoride, aluminum fluoride, strontium chloride, magnesium chloride, and aluminum chloride, and
(2) borate such as $B_2O_3$, $H_3BO_3$, and $NaB_4O_7$.

The binder 40 serves as a binder for stably binding the fluorescent material powder 30. The material for the binder 40 is preferably an inorganic material which is more resistant to discoloration than an organic material. Further, in the case where a fluorescent material powder made of an oxide is used, it is preferable to use an inorganic oxide material. With this arrangement, an element common to the fluorescent material powder and a binder can be contained, and thus enables to form a wavelength converting member in which the fluorescent material powder and the binder are firmly bonded. Examples of the oxides to be used for the binder include $Al_2O_3$, $MgO$, $ZrO_2$, $BaO$, $Lu_2O_3$, $TiO_2$, $Cr_2O_3$, $WO_3$, $V_2O_5$, $MoO_3$, $SrO$, $Na_2O$, $Y_2O_3$, $SiO_2$, $B_2O_3$, $P_2O_5$, $PbO$, $N_2O$, $K_2O$, and $CaO$.

In the case where the wavelength converting member 20 is formed by using a sintering technique, an aid agent (not shown) for accelerating the sintering can be used. As described above, an aid agent used at this stage is referred to as an aid agent B. More specifically, the wavelength converting member 20 can be formed by mixing a fluorescent material powder 30, a binder 40, and an aid agent B, and sintering the mixture. This allows formation of a wavelength converting member 20 in which the fluorescent material powder 30 and the binder 40 are well-bonded, even if the sintering is performed at a relatively low temperature. In the case where the fluorescent material powder 30 is $Lu_3Al_5O_{12}$ or $Y_3Al_5O_{12}$ and the supporting member 40 is $Al_2O_3$, $NH_4Cl$, $AlF_3$, $H_3BO_3$, or the like, can be used for the aid agent B.

In the case where a fluorescent material powder made of a rare-earth aluminate fluorescent material is used, a halogenide such as aluminum fluoride, magnesium fluoride, and barium fluoride is preferably used as the aid agent B.

In the case where a fluorescent material powder made of a nitride-based fluorescent material is used, (1) a halogenide such as a chloride compound or a fluoride compound, for example, aluminum fluoride, magnesium fluoride, or barium fluoride, or (2) a chloride compound such as strontium chloride, magnesium chloride, or ammonium chloride is preferably used as the aid agent B.

The first recess 50a formed in the upper surface 40s (i.e. bottom surface of the first recesses 50) of the binder 40 can be formed by using the difference in the etch rates of the fluorescent material powder 30 and the binder 40 with the aid agent A which is used in preparation of the fluorescent material powder. That is, the upper surface of the wavelength converting member is etched with the use of an etching solution having a higher etch rate to the aid agent A than to the fluorescent material powder 30 and binder 40. With this arrangement, the aid agent A adhered to the periphery (i.e. side surfaces) of the fluorescent material powder 30 is preferentially etched, so that the first recesses 50a are formed, and thus expose portions of the side surfaces of the fluorescent material powder 30. As described above, the first recesses 50a can be formed interposed between the fluorescent material powder 30 and the binder 40 in top view.

Also, a portion of the aid agent B used in the preparation of the wavelength converting member 20 by using a sintering technique is naturally adhere to the periphery (i.e. side surfaces) of the fluorescent material powder 30, and in that case, the aid agent B also contributes to the formation of the first recesses 50a. In this case, with the use of the aid agent A and the aid agent B of the same kind or the same agent, the aid agent B can contribute more efficiently to the formation of the first recesses 50a.

The first recesses 50a can be formed by using common dry etching technique or wet etching technique after the wavelength converting member 20 is mechanically polished. But in the present embodiment, CMP (Chemical Mechanical Polishing) processing is applied to the wavelength converting member 20 made of the materials in which the aid agent A has a higher etch rate than the fluorescent material powder 30 and the binder 40 so that the aid agent is preferentially etched to form the first recesses 50a in the surfaces subjected to CMP. The second recesses 50 can be formed regardless of the presence or absence of the aid agent A and the aid agent B, using the difference in the etch rates of the fluorescent material powder 30, the binder 40, and the aid agent.

As described above, the second recesses 50 and the first recesses 50a can be formed by using the difference in the etch rates of the fluorescent material powder 30, the binder 40, and the aid agents.

The second recesses 50 which are respectively formed with the surfaces 40s of the binder 40, located lower than the upper surfaces 30us of the fluorescent material powder 30 can be formed by using the difference in the etch rates of the fluorescent material powder 30 and the binder 40.

As described above, by exposing large areas of the surfaces of the fluorescent material powder 30 with the formation of the first recesses 50a, absorption of light by the binder 40 can be prevented. Further, by exposing larger areas of the surfaces of the fluorescent material powder 30 with the formation of the second recesses 50, absorption of light by the binder 40 can be further prevented. Particularly, exposing the upper surface of the fluorescent material powder 30 by applying CMP processing enables removing of a damaged layer near the surface resulting from the polishing or the like, so that the wavelength conversion efficiency of the fluorescent material powder 30 can be further improved.

In CMP processing, a slurry containing abrasive grain such as $SiO_2$ or $CeO_2$ can be used. Commonly CMP processing is performed only to achieve a flat surface by removing damaged layer, but in the present embodiment, performing CMP processing on the wavelength converting member 20 made of a plurality of materials having different etch rates so as to form the flat surface, the first recesses 50a, and the second recesses 50, simultaneously. The depth of the first recesses 50a and the second recesses 50 can be adjusted by the material of the CMP pad, the pressure applied on the wavelength converting member 20 against the CMP pad (hereinafter may be referred simply as application of pressure), and the CMP processing time. Examples of the CMP pad include a urethane-based IC1000 and a suede type Supreme RN—H, which has high compressibility. The pressure applied in the CMP processing is preferably 50 to 300 $g/cm^2$ and more preferably 100 to 200 $g/cm^2$, for the reason that a low pressure may reduce productivity and a high pressure tends to cause a crack in the wavelength converting member. The processing time of the CMP processing is not specifically limited as long as the first recesses 50*a* and the second recesses 50 are sufficiently formed. In order to perform the CMP processing, a coarse polishing may be applied prior to the CMP processing by using an abrasive grain such as a diamond abrasive grain. The use of a diamond abrasive grain having an average particle size of 1 to 3 μm can facilitate subsequent CMP processing. The polishing can be performed a plurality of times using the abrasive grain with the particle size decreasing in a stepwise fashion. In a similar manner, polishing and CMP processing can also applied on the lower surface of the wavelength converting member 20. With this, the wavelength converting member can be placed stably on the substrate 10.

The effects of the present invention can also be obtained with the flat surface of the fluorescent material powder and the flat surface of the binder 40 are on the same plane at the upper surface of the wavelength converting member 20, but forming the fluorescent material powder 30 employing a material having a lower etch rate than that of the binder 40 allows a configuration in which the flat surface of the fluorescent material powder 30 is protruded to the upper surface side more than the flat surface of the binder 40. With this arrangement, the exposed area of the side surfaces of the fluorescent material powder 30 is further increased, which enables prevention of the light emitted from the fluorescent material powder 30 from irradiating the binder 40, and thus enables further improvement in the optical output.

The upper surface of the wavelength converting member 20 is preferably formed so that light whose wavelength is converted by the fluorescent material power 30 can be emitted and light for exciting the fluorescent material powder 30 can be entered. With this arrangement, a part of the excitation light incident on the side surfaces of the fluorescent material powder 30 enters the fluorescent material powder 30 through the side surfaces 30*ss* exposed by the first recesses 50*a* and the second recesses 50 without passing through the binder 40, so that the excitation light can be irradiated efficiently. Further, the light released from the side surfaces 30*ss* of the fluorescent material powder 30 is released to outside through the second recesses 50 without passing through the binder 40, so that the optical output can be improved.

Further, in order to protect the wavelength converting member and to improve the light extracting efficiency, a non-reflecting protective film can also be disposed (i.e., applying a non-reflecting coating) on the upper surface (i.e., light emitting surface) of the wavelength converting member 20. Also, in order to reflect light to the upper surface side of the wavelength converting member, a reflecting film can be also disposed on the lower surface (that is, the surface at the substrate 10 side, i.e., the surface on the opposite side of the light emitting surface) of the wavelength converting member. For the reflecting film, a metal, an insulating film such as $Al_2O_3$, or a dielectric multilayer can be disposed singly or in combination. With this arrangement, optical output from the upper surface of the wavelength converting device 100 can be further enhanced. In FIG. 1, the non-reflecting protective film and the reflecting film are omitted.

With the use of the wavelength converting device 100 constituted as described above and a light source for exciting the fluorescent material powder 30 of the wavelength converting device 100, various light emitting devices can be fabricated. With this arrangement, a light emitting device having high optical output can be provided. For the light source, a LED or LD can be used, but a LD, which is capable of irradiating a specific small area, is preferably used.

Light Emitting Device 1

Figure 3:
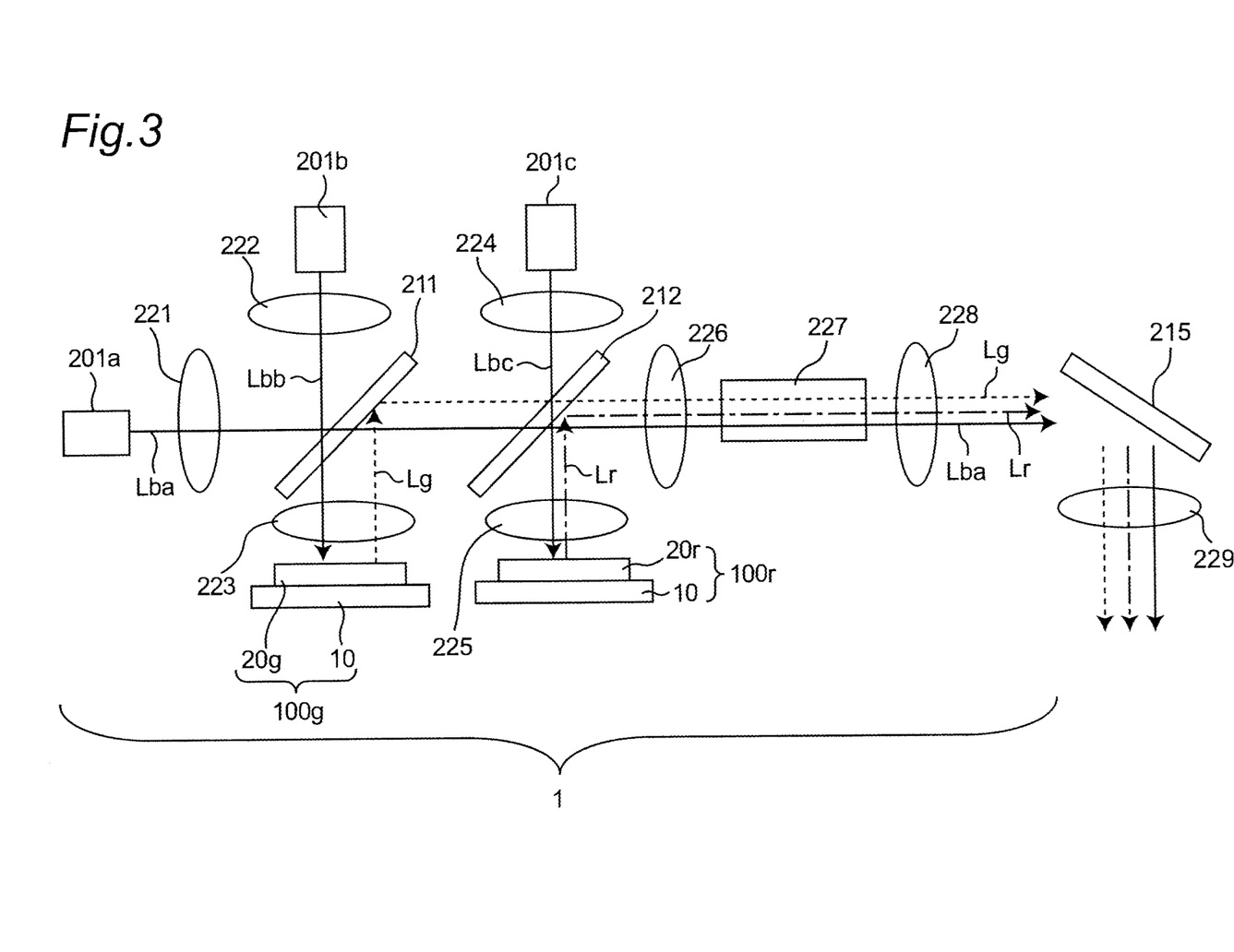
FIG. 3 is a block diagram of a light emitting device according to an embodiment of the present invention.

A light emitting device 1 according to the present invention is, for example, a light source for a projector, and as shown in FIG. 3, includes three blue light emitting elements (for example, blue laser diodes) 201*a*, 201*b*, and 201*c*, a wavelength converting device 100*g* for green light 100*g* capable of converting incident light from the blue light emitting elements 201*b* and emitting green light, a wavelength converting device for red light 100*r* capable of converting incident light from the blue light emitting elements 201*c* and emitting red light, and an optical system including a plurality of lenses and a dichroic mirror, and configured to emit three colors of light: blue, green, and red.

In the light emitting device 1 shown in FIG. 3, blue light Lba emitted from the blue light emitting element (for example a blue laser diode) 201*a* is emitted through the lens 221, the dichroic mirror 211, the dichroic mirror 212, and the lenses 226, 227, and 228.

In the light emitting device 1 shown in FIG. 3, blue light Lbb emitted from the blue light emitting element (for example a blue laser diode) 201*b* is entered in the wavelength converting device 100*g* for green light through the lens 222, the dichroic mirror 211, and the lens 223. The blue light Lbb entered in the wavelength converting device 100*g* for green light is converted into a green light Lg by the wavelength converting device 100*g* for green light and emitted. The green light Lg is then reflected at the dichroic mirror 211 and emitted through the lenses 226, 227, and 228.

In the light emitting device 1 shown in FIG. 3, blue light Lbc emitted from the blue light emitting element (for example a blue laser diode) 201*c* is entered in the wavelength converting device 100*r* for red light through the lens 224, the dichroic mirror 212, and the lens 225. The blue light Lbc entered in the wavelength converting device 100*r* for red light is converted into a red light Lr by the wavelength converting device 100*r* for red light and emitted. The red light Lr is then reflected at the dichroic mirror 212 and emitted through the lenses 226, 227, and 228.

A dichroic mirror is used to reflect of specific wavelength and allow light of other wavelengths to pass through. In the light emitting device 1, the dichroic mirror 211 is configured to reflect light in a green wavelength range and allow light of other wavelengths to pass through, and the dichroic mirror 212 is configured to reflect light in a red wavelength range and allow light of other wavelengths to pass through.

As described above, the light emitting device 1 is capable of emitting three colors of light: blue, green, and red. In the case where the light emitting device 1 is used in a projector, the three colors of light, blue, green, and red emitted from the wavelength converting device 1 is irradiated on an image sensor 215. The image sensor 215 creates an outputting image expanded in two dimensions, then the image is magnified by the projection lens 229 and projected onto a screen.

The image sensor 215 may include, for example, a DMD in which a plurality of micromirrors are arranged in an array, corresponding to the number of pixels. The rotation angles of the mirrors are controlled corresponding to the projection image, and an output image is created.

Light Emitting Device 2

Figure 4:
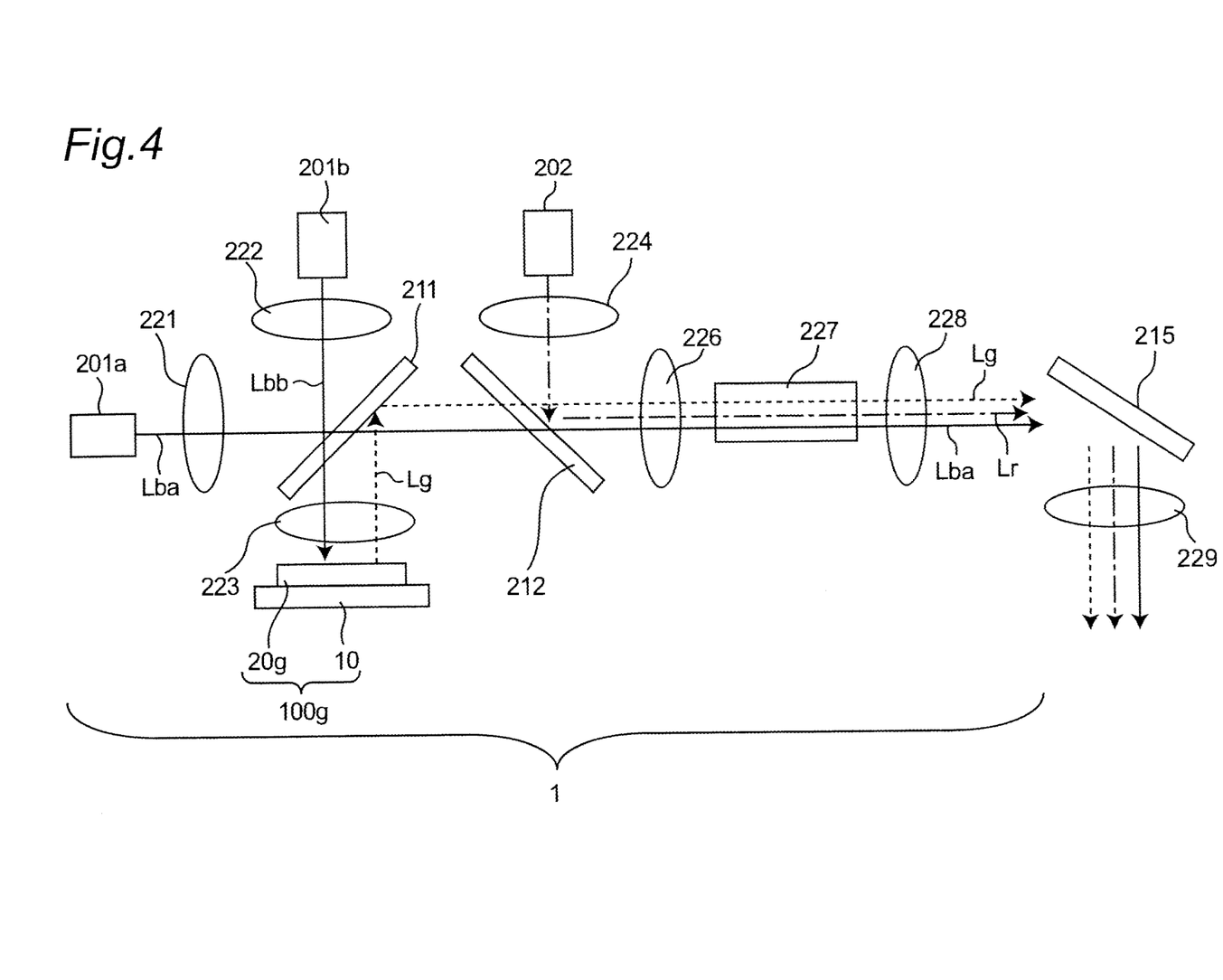
FIG. 4 is a block diagram of a light emitting device according to an another embodiment of the present invention.

The light emitting device 2 is similar to the light emitting device 1 in Example 1, a light source used for example for a projector, and constituted as shown in FIG. 4.

The light emitting device 2 is constituted in a same manner as in the light emitting device 1, except that instead of the blue light emitting element (for example a blue laser diode) 201c and the wavelength converting device 100r for red light, a red light emitting element (for example a red laser diode) is used. Corresponding to the change described above, the lens 225 is omitted and the direction of the dichroic mirror 212 is changed.

The light emitting device 2 constituted as describe above operates in a similar manner as the light emitting device 1, except that the red light Lr emitted from the red light emitting element 202 is reflected at the dichroic mirror 212 and emitted through the lenses 226, 227, and 228.

In the light emitting device 1 describe above, in addition to a blue laser diode, other light sources such as a light emitting diode (LED) and a super luminescent diode (SLD) can be selected for the blue light emitting element. In the light emitting device 2, in addition to a red laser diode, other light sources such as a light emitting diode (LED) and a super luminescent diode (SLD) can be selected for the red light emitting element.

A super luminescent diode (SLD) is a light emitting element that possesses a broad emission spectrum compared to that of a laser diode (LD) and a high directivity compared to that of a light emitting diode (LED).

The light emitting element used corresponding to each color is not limited to one and a plurality of light elements may be arranged.

EXAMPLE 1

1. Preparation of Fluorescent Material Powder 30

Predetermined amounts of raw materials of the fluorescent material, $Lu_2O_3$, $Al_2O_3$, and $CeO_2$ are mixed, and an aid agent A of $BaF_2$ is added to the mixture as a flux and adequately mixed. Then the mixture is placed in an alumina crucible and sintered in a mixed gas atmosphere of hydrogen and nitrogen in which the hydrogen concentration is 3 volume % or less, at 1400° C. for three hours. The sintered material is then ball-milled in water, washed, separated, dried, and sieved to obtain a fluorescent material powder made of $Y_3Al_5O_{12}$:Ce (YAG) having an average particle diameter of about 10 μm.

2. Preparation of Wavelength Converting Member 20

A fluorescent material powder 30 made of $Lu_3Al_5O_{12}$:Ce having an average particle diameter of about 10 μm, obtained as described above, and a supporting member 40 made of $Al_2O_3$ are mixed. Then, $BaF_2$ is added as a sintering aid B, and the mixture is sintered by using SPS technique. The wavelength converting member 20 obtained by the sintering is cut to a thickness of 350 μm by using a wire saw.

3. Formation of Recesses and Evaluation

Figure 2:
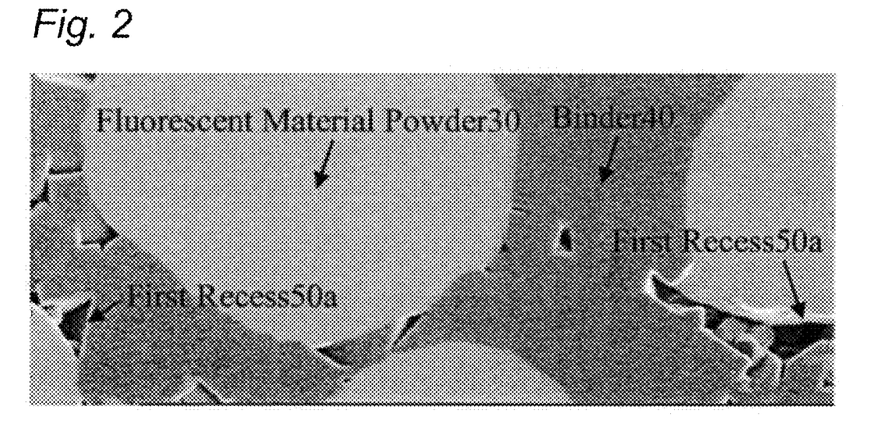
FIG. 2 is a photograph of a top view of a wavelength converting device according to an embodiment of the present invention.

Next, the upper surface of the wavelength converting member 20 is polished with a diamond abrasive having a particle size of 3 μm, and then polished again with a diamond abrasive having a particle size of 1 μm. Then, CMP processing is performed on the polished surface by using a slurry made of a $SiO_2$ abrasive and a PH controlling solution and a urethane-based CMP pad, under a pressurized condition of 150 g/cm² for 2 hours. By this treatment, the thickness of the wavelength converting member 20 is reduced to 100 μm and as shown in FIG. 2, the upper surface of the wavelength converting member 20 is made flat and the first recesses 50a and the second recesses 50 are formed to expose the side surfaces 30ss of the fluorescent material powder 30. The first recesses 50a have a width of 2 μm and a depth of about 1 μm. The second recesses 50 have a depth of 10 nm or greater. In a similar manner, rough polishing and CMP processing are applied on the lower surface of the wavelength converting member 20.

Next, on the upper surface of the wavelength converting member 20, as a non-reflecting protective film, $SiO_2$ is disposed with a thickness of 76 nm by using a sputtering technique, and on the lower surface of the wavelength converting member 20, as a reflecting film, a film of Ag is disposed with a thickness of 1000 nm by using a sputtering technique.

Next, the wavelength converting member 20 is divided into chips of 4 mm×4 mm, then, each chip is placed on the substrate 10 made of copper with an interposing bonding film made of Au/Sn having a thickness of 30 μm, and thus the wavelength converting device 100 is fabricated.

Then, the upper surface of the wavelength converting device 100 is irradiated with a blue laser element having a peak wavelength of 445 nm as an exciting light source, and green light having a wavelength of 540 nm is emitted from the wavelength converting device 100 and an enhancement in the optical output is achieved.

EXAMPLE 2

1. Preparation of Fluorescent Material Powder 30

The raw materials of the fluorescent material, $Y_2O_3$, $Al_2O_3$, and $CdO_2$ are mixed, to which, an aid agent A of $BaF_2$ is added to the mixture as a flux and adequately mixed. Then the mixture is placed in an alumina crucible and sintered in a mixed gas atmosphere of hydrogen and nitrogen in which the hydrogen concentration is 3 volume % or less, at 1400° C. for three hours. The sintered material is then ball-milled in water, washed, separated, dried, and sieved to obtain a YAG fluorescent material.

2. Preparation of Wavelength Converting Member 20

A fluorescent material powder 30 made of $Y_3Al_5O_{12}$:Ce and a binder 40 made of $Al_2O_3$ are mixed. Then, $BaF_2$ is added as a sintering aid B, and the mixture is sintered by using SPS technique. The wavelength converting member 20 obtained by the sintering is cut to a thickness of 350 μm by using a wire saw.

3. Formation of Recesses and Evaluation

Next, in a similar manner to that used in Example 1, rough polishing and CMP processing are applied on the upper surface and the lower surface of the wavelength converting member 20. With the above treatments, the first recesses 50a and the second recesses 50 respectively exposing parts of the side surfaces 30ss of the fluorescent material powder 30 are formed. The first recesses 50a have a similar width and depth, the second recesses 50 had a similar depth, respectively as in Example 1.

Next, in a similar manner as in Example 1, on the upper surface of the wavelength converting member 20, as a non-reflecting protective film, $SiO_2$ is disposed with a thickness of 76 nm by using a sputtering technique, and on the lower surface of the wavelength converting member 20, as a reflecting film, a film of Ag is disposed with a thickness of 1000 nm by using a sputtering technique.

Next, the wavelength converting member 20 is divided into chips of 4 mm×4 mm, then, each chip is placed on the substrate 10 made of copper with an interposing bonding film made of Au/Sn having a thickness of 30 μm, and thus the wavelength converting device 100 is fabricated.

Then, using a blue laser element of 445 nm as an excitation light source as in Example 1, blue laser light of 445 nm is irradiated on the upper surface of the wavelength converting device 100, and a yellow light having a peak wavelength of 560 nm is released from the wavelength converting device 100, with a high optical output power as in Example 1.

EXAMPLE 3

1. Preparation of Fluorescent Material Powder 30 and Wavelength Converting Member 20

In Example 3, firstly, in a similar manner as in Example 1, fluorescent material powder 30 made of $Lu_3Al_5O_{12}$:Ce having an average particle diameter of about 10 μm was prepared, and the fluorescent material powder 30 and a binder 40 made of $Al_2O_3$ were mixed. Then, different from that in Example 1, without adding the aid agent B, sintering was carried out by using SPS technique. The wavelength converting member 20 obtained by the sintering was cut to a thickness of 350 μm by using a wire saw.

2. Formation of Recesses and Evaluation

Next, the upper surface of the wavelength converting member 20 was polished with a diamond abrasive having a particle size of 3 μm, and then polished again with a diamond abrasive having a particle size of 1 μm. Then, CMP processing was performed on the polished surface by using a slurry made of a $SiO_2$ abrasive and a PH controlling solution and a suede-type CMP pad, under a pressurized condition of 200 g/cm$^2$ for 3 hours. By this treatment, the thickness of the wavelength converting member 20 was reduced to 100 μm and as shown in FIG. 2, the upper surface of the wavelength converting member 20 was made flat and the first recesses 50a and the second recesses 50 are formed to expose the side surfaces 30ss of the fluorescent material powder 30. The first recesses 50a had a width of 2 μm and a depth of 1 μm. The second recesses 50 had a depth of 10 nm. In a similar manner, rough polishing and CMP processing were applied on the lower surface of the wavelength converting member 20.

Then, in a similar manner as in Example 1, a reflective film was formed and disposed on the substrate 10 made of copper, and thus a wavelength converting device 100 was formed.

EXAMPLE 4

1. Preparation of Fluorescent Material Powder 30

The raw materials of the fluorescent material, $Y_2O_3$, $Al_2O_3$, and $CeO_2$ were mixed, to which, an aid agent A of $BaF_2$ was added to the mixture as a flux and adequately mixed. Then the mixture was placed in an alumina crucible and sintered in a mixed gas atmosphere of hydrogen and nitrogen in which the hydrogen concentration is 3 volume % or less, at 1400° C. for 3 hours. The sintered material was then ball-milled in water, washed, separated, dried, and sieved to obtain a $Y_3Al_5O_{12}$:Ce (YAG) fluorescent material.

2. Preparation of Wavelength Converting Member 20

A fluorescent material powder 30 made of $Y_3Al_5O_{12}$:Ce and a binder 40 made of $Al_2O_3$ were mixed. Then, without adding the aid agent B, sintering was carried out by using SPS technique. The wavelength converting member 20 obtained by the sintering was cut to a thickness of 350 μm by using a wire saw.

3. Formation of Recesses and Evaluation

Next, the upper surface of the wavelength converting member 20 was polished with a diamond abrasive having a particle size of 3 μm, and then polished again with a diamond abrasive having a particle size of 1 μm. Then, CMP processing was performed on the polished surface by using a slurry made of a $SiO_2$ abrasive and a PH controlling solution and a suede-type CMP pad, under a pressurized condition of 200 g/cm$^2$ for 3 hours. By this treatment, the thickness of the wavelength converting member 20 was reduced to 100 μm and as shown in FIG. 2, the upper surface of the wavelength converting member 20 was made flat and the first recesses 50a and the second recesses 50 are formed to expose the side surfaces 30ss of the fluorescent material powder 30. The first recesses 50a had a width of 2 μm and a depth of 1 μm. The second recesses 50 had a depth of 10 nm or greater. In a similar manner, rough polishing and CMP processing were applied on the lower surface of the wavelength converting member 20.

Then, in a similar manner as in Example 1, a reflective film was formed and disposed on the substrate 10 made of copper, and thus a wavelength converting device 100 was fabricated.

As described above, even in the cases of Examples 3 and 4 where the wavelength converting member 20 was formed with a fluorescent material which was prepared with an addition of aid agent A but without an addition of aid agent B, the first recesses 50a and the second recesses 50 having shapes approximate to those shown in Example 1 were obtained by adjusting the conditions of rough polishing and CMP processing of the wavelength converting member 20. It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

This application is based on application No. 2011-285699 filed in Japan on Dec. 27, 2011, content of which is incorporated hereinto by reference.

DENOTATION OF REFERENCE NUMERALS

1, 2: light emitting device
100: wavelength converting device
10: substrate
20: wavelength converting member
30: fluorescent material powder
40: binder
50a: first recess
50: second recess

What is claimed is:
1. A wavelength converting device comprising:
   a substrate; and
   a wavelength converting member disposed on the substrate;
   wherein the wavelength converting member comprises a fluorescent material powder and a binder binding the fluorescent material powder,
   wherein an upper surface of the wavelength converting member is a light emitting surface comprising upper surfaces of the fluorescent material powder and an upper surface of the binder,
   wherein the binder has a first recess formed adjacent to the fluorescent material powder in the upper surface of the binder,
   wherein the upper surfaces of the fluorescent material powder are protruded from the upper surface of the binder such that a second recess is formed between the fluorescent material powder, the second recess having a bottom surface that is the upper surface of the binder, and
   wherein the first recess is formed in the bottom surface of the second recess.

2. The wavelength converting device according to claim 1, wherein the upper surfaces of the fluorescent material powder and the upper surface of the binder are respectively flat and in parallel with each other.

3. The wavelength converting device according to claim 1, further comprising a non-reflecting coating disposed on the upper surface of the wavelength converting member.

4. The wavelength converting device according to claim 1, wherein the upper surface of the wavelength converting member is a light emitting surface and also an incident surface where light for exciting the fluorescent material powder enters.

5. The wavelength converting device according to claim 1, further comprising a reflecting member interposed between the wavelength converting member and the substrate.

6. The wavelength converting device according to claim 1, wherein the substrate is a ceramic substrate or a metallic substrate.

7. A light emitting device comprising the wavelength converting device according to claim 1, and a light source for exciting the fluorescent material powder of the wavelength converting device.

8. The light emitting device according to claim 7, wherein the light source has a emission peak in a range of 440 to 480 nm and the fluorescent material powder has a emission peak in a range of 500 to 540 nm.

9. A method of manufacturing a wavelength converting device, the method comprising:
preparing a fluorescent material powder by preparing a mixture of raw material powders and a sintering aid agent, and sintering the mixture;
preparing a wavelength converting member by preparing a mixture of the fluorescent material powder and a material of a binder configured to bind the fluorescent material powder, and sintering the mixture;
etching an upper surface of the wavelength converting member by using an etching solution having a higher etch rate to the sintering aid agent than to the fluorescent material powder and the binder such that (i) the binder has a first recess formed adjacent to the fluorescent material powder in an upper surface of the binder, and (ii) upper surfaces of the fluorescent material powder protrude from the upper surface of the binder such that a second recess is formed between the fluorescent material powder, the second recess having a bottom surface which is the upper surface of the binder, wherein the first recess is formed in the bottom surface of the second recess; and
mounting the wavelength converting member on a substrate.

10. The method of manufacturing a wavelength converting device according to claim 9, wherein the etching comprises performing a chemical mechanical polishing process on the upper surface of the wavelength converting member.

11. The wavelength converting device according to claim 1, wherein a thickness of the wavelength converting member is in a range of 50 to 500 μm.

12. The wavelength converting device according to claim 1, wherein the fluorescent material powder comprises a powder made of one selected from a group of $Lu_3Al_5O_{12}$:Ce, $Y_3Al_5O_{12}$:Ce, and $Y_{2.5}Gd_{0.5}Al_{2.5}Ga_{2.5}O_{12}$:Ce.

13. The wavelength converting device according to claim 1, wherein the binder is made of an inorganic material.

14. The wavelength converting device according to claim 1, wherein the binder is made of one selected from a group of $Al_2O_3$, MgO, $ZrO_2$, BaO, $Lu_2O_3$, $TiO_2$, $Cr_2O_3$, $WO_3$, $V_2O_5$, $MoO_3$, SrO, $Na_2O$, $Y_2O_3$, $SiO_2$, $B_2O_3$, $P_2O_5$, PbO, $N_2O$, $K_2O$, and CaO.

15. The wavelength converting device according to claim 1, wherein the fluorescent material powder and the binder contain an element common to the fluorescent material powder and the binder.

16. A projector comprising the light emitting device according to claim 7.

17. The method according to claim 9,
wherein the fluorescent material powder is made of one selected from a group of $Lu_3Al_5O_{12}$:Ce, $Y_3Al_5O_{12}$:Ce, and $Y_{2.5}Gd_{0.5}Al_{2.5}Ga_{2.5}O_{12}$:Ce and,
wherein the binder is made of one selected from a group of $Al_2O_3$ and $BaF_2$.

18. The method according to claim 9, comprising a polishing process and a chemical mechanical polishing process performed after the polishing process, wherein a damaged layer near the upper surface resulting from the polishing process is removed in the chemical mechanical polishing process.

* * * * *